United States Patent
Elson et al.

(10) Patent No.: US 9,454,441 B2
(45) Date of Patent: Sep. 27, 2016

(54) DATA LAYOUT FOR RECOVERY AND DURABILITY

(75) Inventors: Jeremy E. Elson, Seattle, WA (US); Edmund B. Nightingale, Redmond, WA (US); John R. Douceur, Bellevue, WA (US); Stuart Schechter, Kirkland, WA (US); Peter L. Montgomery, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 13/112,978

(22) Filed: May 20, 2011

(65) Prior Publication Data

US 2011/0258483 A1 Oct. 20, 2011

Related U.S. Application Data

(63) Continuation-in-part of application No. 12/763,107, filed on Apr. 19, 2010, now Pat. No. 8,533,299, and a continuation-in-part of application No. 12/763,133, filed on Apr. 19, 2010, now Pat. No. 8,181,061, and a continuation-in-part of application No. 13/017,193, filed on Jan. 31, 2011, now Pat. No. 8,996,611.

(51) Int. Cl.
*G06F 15/177* (2006.01)
*G06F 11/16* (2006.01)
(Continued)

(52) U.S. Cl.
CPC ........ *G06F 11/1662* (2013.01); *G06F 11/1076* (2013.01); *G06F 11/2035* (2013.01); *G06F 11/2048* (2013.01); *G06F 2211/104* (2013.01)

(58) Field of Classification Search
USPC ................ 714/4.11; 709/220–223, 239, 245; 713/176; 726/2, 3; 707/9, 10, 104.1
See application file for complete search history.

(56) References Cited

U.S. PATENT DOCUMENTS

| | | |
|---|---|---|
| 4,491,945 A | 1/1985 | Turner |
| 4,780,870 A | 10/1988 | McHarg et al. |

(Continued)

FOREIGN PATENT DOCUMENTS

| | | |
|---|---|---|
| CN | 1871806 A | 11/2006 |
| EP | 2192729 | 6/2010 |

(Continued)

OTHER PUBLICATIONS

Non-Final Office Action for U.S. Appl. No. 12/763,133, mailed on Sep. 16, 2011, Edmund Nightingale, "Memory Management and Recovery for Datacenters", 18 pages.

(Continued)

*Primary Examiner* — Khaled Kassim
*Assistant Examiner* — Berhanu Belete
(74) *Attorney, Agent, or Firm* — Alin Corie; Sandy Swain; Micky Minhas

(57) ABSTRACT

A Metadata server described herein is configured to generate a metadata table optimized for data durability and recovery. In generating the metadata table, the metadata server associates each possible combination of servers with one of the indices of the table, thereby ensuring that each server participates in recovery in the event of a server failure. In addition, the metadata server may also associate one or more additional servers with each index to provide added data durability. Upon generating the metadata table, the metadata server provides the metadata table to clients or servers. Alternatively, the metadata server may provide rules and parameters to clients to enable those clients to identify servers storing data items. The clients may use these parameters and an index as inputs to the rules to determine the identities of servers storing or designated to store data items corresponding to the index.

20 Claims, 6 Drawing Sheets

(51) Int. Cl.
*G06F 11/10* (2006.01)
*G06F 11/20* (2006.01)

(56) References Cited

U.S. PATENT DOCUMENTS

| | | | |
|---|---|---|---|
| 5,305,320 A | 4/1994 | Andrews et al. | |
| 5,408,649 A | 4/1995 | Beshears et al. | |
| 5,423,046 A | 6/1995 | Nunnelley et al. | |
| 5,446,915 A | 8/1995 | Pierce | |
| 5,553,285 A | 9/1996 | Krakauer et al. | |
| 5,621,884 A | 4/1997 | Beshears et al. | |
| 5,663,951 A | 9/1997 | Danneels et al. | |
| 5,778,384 A | 7/1998 | Provino et al. | |
| 5,914,878 A | 6/1999 | Yamamoto et al. | |
| 5,938,732 A | 8/1999 | Lim et al. | |
| 5,970,232 A | 10/1999 | Passint et al. | |
| 6,230,252 B1 | 5/2001 | Passint et al. | |
| 6,424,979 B1 | 7/2002 | Livingston et al. | |
| 6,480,970 B1 | 11/2002 | DeKoning et al. | |
| 6,577,613 B1 | 6/2003 | Ramanathan | |
| 6,728,747 B1 | 4/2004 | Jenkins et al. | |
| 6,850,489 B1 | 2/2005 | Omi et al. | |
| 6,871,295 B2 | 3/2005 | Ulrich et al. | |
| 6,963,996 B2 | 11/2005 | Coughlin | |
| 7,076,555 B1 | 7/2006 | Orman et al. | |
| 7,107,606 B2 | 9/2006 | Lee | |
| 7,113,993 B1* | 9/2006 | Cappiello | H04L 67/1008 709/227 |
| 7,115,919 B2 | 10/2006 | Kodama | |
| 7,139,933 B2 | 11/2006 | Hsu et al. | |
| 7,165,256 B2 | 1/2007 | Boudnik et al. | |
| 7,171,491 B1 | 1/2007 | O'Toole et al. | |
| 7,180,875 B1 | 2/2007 | Neumiller et al. | |
| 7,184,958 B2 | 2/2007 | Kagoshima et al. | |
| 7,231,475 B1 | 6/2007 | Singla et al. | |
| 7,240,358 B2 | 7/2007 | Horn et al. | |
| 7,272,613 B2 | 9/2007 | Sim et al. | |
| 7,342,876 B2 | 3/2008 | Bellur et al. | |
| 7,356,213 B1 | 4/2008 | Cunningham et al. | |
| 7,383,288 B2 | 6/2008 | Miloushev et al. | |
| 7,430,568 B1 | 9/2008 | DeKoning et al. | |
| 7,433,332 B2 | 10/2008 | Golden et al. | |
| 7,437,407 B2 | 10/2008 | Vahalia et al. | |
| 7,496,233 B2 | 2/2009 | Kirihara et al. | |
| 7,577,817 B2 | 8/2009 | Karpoff et al. | |
| 7,610,348 B2 | 10/2009 | Kisley et al. | |
| 7,657,581 B2* | 2/2010 | Orenstein | G06F 11/2097 705/51 |
| 7,725,437 B2 | 5/2010 | Kirshenbaum et al. | |
| 7,756,826 B2* | 7/2010 | Bots | H04L 67/06 707/624 |
| 7,769,843 B2 | 8/2010 | Neuse et al. | |
| 7,774,469 B2 | 8/2010 | Massa et al. | |
| 7,779,148 B2 | 8/2010 | Arimilli et al. | |
| 7,797,453 B2 | 9/2010 | Meijer et al. | |
| 7,801,994 B2 | 9/2010 | Kudo | |
| 7,805,580 B2 | 9/2010 | Hirzel et al. | |
| 7,817,880 B1 | 10/2010 | Drost et al. | |
| 7,840,136 B1 | 11/2010 | Cunningham et al. | |
| 7,916,703 B2 | 3/2011 | Yang et al. | |
| 7,921,267 B1 | 4/2011 | Yadav et al. | |
| 7,930,595 B2 | 4/2011 | Gooding | |
| 8,001,352 B1 | 8/2011 | Chatterjee et al. | |
| 8,010,829 B1 | 8/2011 | Chatterjee et al. | |
| 8,037,478 B2 | 10/2011 | Tanaka et al. | |
| 8,041,760 B2 | 10/2011 | Mamou et al. | |
| 8,074,107 B2 | 12/2011 | Sivasubramanian et al. | |
| 8,160,063 B2 | 4/2012 | Maltz et al. | |
| 8,181,061 B2 | 5/2012 | Nightingale et al. | |
| 8,195,950 B2 | 6/2012 | Spearman | |
| 8,234,518 B2 | 7/2012 | Hansen | |
| 8,261,033 B1 | 9/2012 | Slik et al. | |
| 8,266,136 B1* | 9/2012 | Pogde | G06F 17/30091 707/711 |
| 8,274,987 B2 | 9/2012 | Jia | |
| 8,296,398 B2 | 10/2012 | Lacapra et al. | |
| 8,296,408 B2 | 10/2012 | Anke et al. | |
| 9,268,651 B1 | 2/2016 | Salyers et al. | |
| 2001/0042157 A1 | 11/2001 | Pascucci et al. | |
| 2002/0083134 A1 | 6/2002 | Bauer, Jr. et al. | |
| 2002/0093948 A1 | 7/2002 | Dertz et al. | |
| 2002/0152293 A1* | 10/2002 | Hahn | H04L 29/12066 709/223 |
| 2002/0194245 A1 | 12/2002 | Simpson et al. | |
| 2003/0014393 A1 | 1/2003 | Kabra et al. | |
| 2003/0131207 A1* | 7/2003 | Arakawa | G06F 3/0605 711/162 |
| 2004/0085953 A1* | 5/2004 | Davis | H04L 45/00 370/356 |
| 2004/0153479 A1* | 8/2004 | Mikesell | H04N 21/6125 |
| 2004/0236983 A1 | 11/2004 | Burton et al. | |
| 2005/0075911 A1 | 4/2005 | Craven | |
| 2005/0078655 A1 | 4/2005 | Tiller et al. | |
| 2005/0094640 A1 | 5/2005 | Howe | |
| 2005/0111423 A1 | 5/2005 | Anderson et al. | |
| 2005/0138186 A1 | 6/2005 | Hesselink et al. | |
| 2005/0256972 A1 | 11/2005 | Cochran et al. | |
| 2005/0262097 A1 | 11/2005 | Sim-Tang et al. | |
| 2006/0004759 A1* | 1/2006 | Borthakur | G06F 17/30067 |
| 2006/0015495 A1 | 1/2006 | Keating et al. | |
| 2006/0074946 A1 | 4/2006 | Pham | |
| 2006/0098572 A1 | 5/2006 | Zhang et al. | |
| 2006/0129614 A1 | 6/2006 | Kim et al. | |
| 2006/0159456 A1 | 7/2006 | Gumaste et al. | |
| 2006/0280168 A1 | 12/2006 | Ozaki | |
| 2006/0288080 A1 | 12/2006 | Orszag et al. | |
| 2007/0025381 A1 | 2/2007 | Feng et al. | |
| 2007/0036093 A1 | 2/2007 | Newberg et al. | |
| 2007/0043824 A1 | 2/2007 | Fremantle | |
| 2007/0094691 A1 | 4/2007 | Gazdzinski | |
| 2007/0147322 A1 | 6/2007 | Agrawal et al. | |
| 2007/0153755 A1 | 7/2007 | Yang et al. | |
| 2007/0156842 A1 | 7/2007 | Vermeulen et al. | |
| 2007/0158432 A1 | 7/2007 | Tadamasa | |
| 2007/0204028 A1 | 8/2007 | Lee | |
| 2007/0230493 A1 | 10/2007 | Dravida et al. | |
| 2007/0248089 A1 | 10/2007 | Redi et al. | |
| 2007/0266208 A1* | 11/2007 | Kim | G06F 21/10 711/154 |
| 2007/0266244 A1 | 11/2007 | Walker et al. | |
| 2007/0282787 A1* | 12/2007 | Shirai | G06F 17/30038 |
| 2007/0286135 A1 | 12/2007 | Kirke | |
| 2008/0005275 A1 | 1/2008 | Overton et al. | |
| 2008/0010400 A1 | 1/2008 | Moon | |
| 2008/0098392 A1 | 4/2008 | Wipfel et al. | |
| 2008/0104442 A1 | 5/2008 | Diao et al. | |
| 2008/0114827 A1 | 5/2008 | Gerber et al. | |
| 2008/0162622 A1* | 7/2008 | Becker | G06F 17/30557 709/201 |
| 2008/0215727 A1 | 9/2008 | Denis et al. | |
| 2008/0222080 A1* | 9/2008 | Stewart | G06F 17/30321 |
| 2008/0222104 A1* | 9/2008 | Stewart | G06F 17/30321 |
| 2008/0256138 A1 | 10/2008 | Sim-Tang | |
| 2008/0320138 A1* | 12/2008 | Wada | G06F 9/5072 709/226 |
| 2009/0006888 A1 | 1/2009 | Bernhard et al. | |
| 2009/0097443 A1 | 4/2009 | Pasanen et al. | |
| 2009/0106269 A1 | 4/2009 | Zuckerman et al. | |
| 2009/0109891 A1 | 4/2009 | Fonseca, Jr. et al. | |
| 2009/0112921 A1 | 4/2009 | Oliveira et al. | |
| 2009/0113323 A1 | 4/2009 | Zhao et al. | |
| 2009/0144422 A1* | 6/2009 | Chatley | G06F 3/0613 709/226 |
| 2009/0183002 A1 | 7/2009 | Rohrer et al. | |
| 2009/0198958 A1 | 8/2009 | Arimilli et al. | |
| 2009/0201923 A1 | 8/2009 | Menon et al. | |
| 2009/0204405 A1 | 8/2009 | Kato et al. | |
| 2009/0213731 A1 | 8/2009 | Bhasin et al. | |
| 2009/0249418 A1 | 10/2009 | Alastruey Gracia et al. | |
| 2009/0259665 A1 | 10/2009 | Howe et al. | |
| 2009/0265218 A1 | 10/2009 | Amini et al. | |
| 2009/0268611 A1 | 10/2009 | Persson et al. | |
| 2009/0271412 A1* | 10/2009 | Lacapra | G06F 17/30206 |
| 2009/0300407 A1* | 12/2009 | Kamath | G06F 9/505 |

(56) References Cited

U.S. PATENT DOCUMENTS

| | | | |
|---|---|---|---|
| 2009/0307329 A1 | 12/2009 | Olston et al. | 714/4.11 |
| 2010/0005151 A1* | 1/2010 | Gokhale | G06F 17/30286 709/216 |
| 2010/0008230 A1 | 1/2010 | Khandekar et al. | |
| 2010/0008347 A1 | 1/2010 | Qin et al. | |
| 2010/0061366 A1 | 3/2010 | DelRegno et al. | |
| 2010/0094955 A1 | 4/2010 | Zuckerman et al. | |
| 2010/0094956 A1 | 4/2010 | Zuckerman et al. | |
| 2010/0153639 A1 | 6/2010 | Corry et al. | |
| 2010/0161657 A1* | 6/2010 | Cha | G06F 17/30094 707/770 |
| 2010/0169287 A1 | 7/2010 | Klose | |
| 2010/0191919 A1 | 7/2010 | Bernstein et al. | |
| 2010/0198888 A1 | 8/2010 | Blomstedt et al. | |
| 2010/0198972 A1 | 8/2010 | Umbehocker | |
| 2010/0228835 A1 | 9/2010 | Pitts | |
| 2010/0250648 A1* | 9/2010 | Cao | H04L 67/1002 709/203 |
| 2010/0250746 A1 | 9/2010 | Murase | |
| 2010/0277345 A1 | 11/2010 | Rodriguez et al. | |
| 2010/0332454 A1 | 12/2010 | Prahlad et al. | |
| 2010/0332818 A1 | 12/2010 | Prahlad et al. | |
| 2011/0022574 A1 | 1/2011 | Hansen | |
| 2011/0075628 A1 | 3/2011 | Cho et al. | |
| 2011/0083154 A1 | 4/2011 | Boersma | |
| 2011/0099126 A1 | 4/2011 | Belani et al. | |
| 2011/0145442 A1 | 6/2011 | Diab | |
| 2011/0153835 A1 | 6/2011 | Rimac et al. | |
| 2011/0161723 A1 | 6/2011 | Taleck et al. | |
| 2011/0205974 A1 | 8/2011 | Zhu et al. | |
| 2011/0208837 A1 | 8/2011 | Sartori | |
| 2011/0219208 A1 | 9/2011 | Asaad et al. | |
| 2011/0228789 A1 | 9/2011 | Jia | |
| 2011/0246471 A1 | 10/2011 | Rakib | |
| 2011/0246735 A1 | 10/2011 | Bryant et al. | |
| 2011/0258290 A1 | 10/2011 | Nightingale et al. | |
| 2011/0258297 A1 | 10/2011 | Nightingale et al. | |
| 2011/0258482 A1 | 10/2011 | Nightingale et al. | |
| 2011/0258488 A1 | 10/2011 | Nightingale et al. | |
| 2011/0283019 A1 | 11/2011 | Bennett et al. | |
| 2011/0292949 A1 | 12/2011 | Hayashi et al. | |
| 2011/0296025 A1 | 12/2011 | Lieblich et al. | |
| 2011/0307886 A1 | 12/2011 | Thanga et al. | |
| 2012/0041976 A1 | 2/2012 | Annapragada | |
| 2012/0042162 A1 | 2/2012 | Anglin et al. | |
| 2012/0047239 A1 | 2/2012 | Donahue et al. | |
| 2012/0047339 A1 | 2/2012 | Decasper et al. | |
| 2012/0054556 A1 | 3/2012 | Grube et al. | |
| 2012/0158948 A1 | 6/2012 | Pang et al. | |
| 2012/0197958 A1 | 8/2012 | Nightingale et al. | |
| 2012/0207036 A1 | 8/2012 | Ong et al. | |
| 2012/0224481 A1 | 9/2012 | Babiarz et al. | |
| 2012/0256735 A1 | 10/2012 | Gilson | |
| 2012/0278400 A1 | 11/2012 | Elson et al. | |
| 2013/0042156 A1 | 2/2013 | Srinivasan et al. | |
| 2013/0117240 A1 | 5/2013 | Taylor et al. | |
| 2013/0263184 A1 | 10/2013 | Melnychenko et al. | |
| 2015/0052392 A1 | 2/2015 | Mickens et al. | |

FOREIGN PATENT DOCUMENTS

| | | |
|---|---|---|
| WO | WO03038628 A1 | 5/2003 |
| WO | WO2010108368 A1 | 9/2010 |
| WO | WO2013/068023 A1 | 5/2013 |

OTHER PUBLICATIONS

U.S. Appl. No. 12/410,697, "Data Center Without Structural Bottlenecks," Maltz et al, filed Mar. 25, 2009.

U.S. Appl. No. 12/410,745, "Data Center Interconnect and Traffic Engineering," Maltz et al, filed Mar. 25, 2009.

U.S. Appl. No. 12/578,608, "Agile Data Center Network Architecture," Greenberg et al, filed Oct. 14, 2009.

Akturk, "Asynchronous Replication of Metadata Across Multi-Master Servers in Distributed Data Storage Systems", A Thesis Submitted to Louisiana State University and Agricultural and Mechanical College, Dec. 2009, 70 pages.

Bafna et al, "CHIRAYU: A Highly Available Metadata Server for Object Based Storage Cluster File System," retrieved from <<http://abhinaykampasi.tripod.com/TechDocs/ChirayuPaper.pdf>>, IEEE Bombay Section, Year 2003 Prof K Shankar Student Paper & Project Contest, Apr. 2003, 6 pgs.

Buddhikot et al, "Design of a Large Scale Multimedia Storage Server," Journal Computer Networks and ISDN Systems, vol. 27, Issue 3, Dec. 1994, pp. 1-18.

Chen et al, "Replication-Based Highly Available Metadata Management for Cluster File Systems," 2010 IEEE International Conference on Cluster Computing, Sep. 2010, pp. 292-301.

"Citrix Storage Delivery Services Adapter for NetApp Data ONTAP", retrieved on Mar. 9, 2010 at <<http://citrix.com/site/resources/dynamic/partnerDocs/datasheet_adapter.pdf>>, Citrix Systems, Citrix Storage Delivery Services Data sheet, 2008, 2 pgs.

"EMC RecoverPoint Family: Cost-effective local and remote data protection and disaster recovery solution", retrieved on Mar. 9, 2010 at <<http://www.emc.com/collateral/software/data-sheet/h2769-emc-recoverpoint-family.pdf>>, EMC Corporation, Data Sheet H2769.8, 2010, 3 pgs.

Fan et al, "A Failure Recovery Mechanism for Distributed Metadata Servers in DCFS2," Seventh International Conference on High Performance Computing and Grid in Asia Pacific Region, Jul. 20-22, 2004, 7 pgs.

Fu, et al., "A Novel Dynamic Metadata Management Scheme for Large Distributed Storage Systems", Proceedings of the 2008 10th IEEE International Conference on High Performance Computing and Communications, Sep. 2008, pp. 987-992.

Fullmer et al, "Solutions to Hidden Terminal Problems in Wireless Networks," Proceedings of the ACM SIGCOMM '97 Conference on Applications, Technologies, Architectures, and Protocols for Computer Communication, Cannes, France, Oct. 1997, pp. 39-49.

Lang, "Parallel Virtual File System, Version 2", retrieved on Nov. 12, 2010 from <<http://www.pvfs.org/cvs/pvfs-2-7-branch.build/doc/pvfs2-guide/pvfs2-guide.php>>, Sep. 2003, 39 pages.

Mohamed et al, "Extensible Communication Architecture for Grid Nodes," abstract retrieved on Apr. 23, 2010 at <<http://www.computer.org/portal/web/csdl/doi/10.1109/itcc.2004.1286587>>, International Conference on Information Technology: Coding and Computing (ITCC'04), vol. 2, Apr. 5-7, 2004, Las Vegas, NV, 1 pg.

Sinnamohideen et al, "A Transparently-Scalable Metadata Service for the Ursa Minor Storage System," USENIXATC'10 Proceedings of the 2010 USENIX Conference, Jun. 2010, 14 pgs.

Weil et al, "CRUSH: Controlled, Scalable, Decentralized Placement of Replicated Data," Proceedings of SC '06, Nov. 2006, 12 pgs.

Weiser, "Some Computer Science Issues in Ubiquitous Computing," retrieved at <<https://www.cs.ucsb.edu/~ravenben/papers/coreos/Wei93.pdf>>, Mar. 1993, 14 pgs.

Office Action for U.S. Appl. No. 12/766,726, mailed on May 29, 2012, Nightingale et al., "Bandwidth-Proportioned Datacenters", 21 pages.

Office Action for U.S. Appl. No. 12/763,107, mailed on Jul. 20, 2012, Nightingale et al., "Locator Table and Client Library for Datacenters", 11 pages.

Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 pages.

Kennedy, "Is Parallel Computing Dead", retrieved on Oct. 2, 2012, at http://www.crpc.rice.edu/newsletters/oct94/director.html., Parallel Computing Newsletter, vol. 2, Issue 4, Oct. 1994, 2 pages.

Ffice action for U.S. Appl. No. 13/412,944, mailed on Oct. 11, 2012, Nightingale et al., "Reading and Writing During Cluster Growth Phase", 10 pages.

Office action for U.S. Appl. No. 13/017,193, mailed on Dec. 3, 2012, Nightingale et al., "Parallel Serialization of Request Processing", 19 pages.

Office action for U.S. Appl. No. 13/116,270, mailed on Feb. 15, 2013, Nightingale et al., "Server Failure Recovery", 16 pages.

(56) References Cited

OTHER PUBLICATIONS

The PCT Search Report mailed Oct. 23, 2012 for PCT application No. PCT/US2012/035700, 10 pages.
Rhea et al., "Maintenance-Free Global Data Storage", IEEE Internet Computing, 2001, 17 pages.
Office action for U.S. Appl. No. 13/116,270, mailed on Aug. 27, 2013, Nightingale, et al., "Server Failure Recovery", 18 pages.
Office action for U.S. Appl. No. 13/096,194, mailed on Sep. 23, 2013, Elson, et al., "Effective Circuits in Packet-Switched Networks", 26 pages.
Office action for U.S. Appl. No. 13/017,193, mailed on Jun. 3, 2013, Nightingale et al., "Parallel Serialization of Request Processing", 21 pages.
U.S. Appl. No. 13/598,990, "Block Level Access to Parallel Storage", Fan et al, filed Aug 30, 2012.
Baratto et al., "THINC: A Remote Display Architecture for Thin-Client Computing", In Technical Report CUCS-027-04, Jul. 2004, 15 pages.
Bonwick et al., "ZFS: The Last Word in File Systems", retrieved at <<wiki.illumos.org/download/attachments/1146951zfs_last.pdf>>, Sun microsystems, Sep. 2008, 44 pages.
Borthakur, "The Hadoop Distributed File System: Architecture and Design", retrieved at <<http://hadoop.apache.org/docs/stable/hdfs_design.html>>, The Apache Software Foundation, Mar. 2013, 8 pages.
Braam, "The Lustre Storage Architecture", Cluster File Systems, Inc., Aug. 2004, 439 pages.
Carnes rt al., "PVFS: A Parallel File System for Linux Clusters", In Proceedings of the Extreme Linux Track: 4th Annual Linux Showcase and Conference, Oct. 2000, 11 pages.
"Citrix Xen-Desktop Virtualization Desktop Infrastructure", retrieved on Jun. 11, 2013 at <<http://www.citrix.com/solutions/desktop-virtualization/overview.html>> Citrix Systems, Inc., 2 pages.
Norton et al., "Common Internet File System (CIFS) Technical Reference", Storage Networking Industry Association, Mar. 2002, 150 pages.
Feller, Virtual Desktop Resource Allocation, retrieved at <<http://blogs.citrix.com/2010/11/12/virtual-desktop-resource-allocation>>, Citrix Systems, Inc., Nov. 2010, 2 pages.
Fellows, "Storage Optimization for VDI", Storage Networking Industry Association, 2011, 42 pages.
Ghemawat et al., "The Google File System", In Proceedings of the Ninetheenth ACM Symposium on Operating Systems Principles, Oct. 2003, 15 pages.
Greenberg et al., "Towards a Next Generation Data Center Architecture: Scalability and Commoditization", In Proceedings of theACM Workshop on Programmable Routers for Extensible Service of Tomorrow, Aug. 2008, pp. 57-62.
Hartman et al., "The Zebra Striped Network File System" In Proceedings of the Fourteenth ACM Symposium on Operating Systems Principles, Dec. 1993, pp. 29-43.
Hitz et al., "File System Design for an NFS File Server Appliance" USENIX Winter 1994 Conference, Jan. 1994, 23 pages.
Hopkins et al., "AoE (ATA over Ethernet)", The Brantley Coile Company, Inc., Feb. 2009, 14 pages.
TechNet, "How Dynamic Disks and vols. Work", available at <<http://technet.microsoft.com/en-us/library/cc758035>>, Microsoft, last updated Mar. 2003, 19 pages.
Howard et al., "Scale and Performance in a Distributed File System", Journal of ACM Transactions on Computer Systems, vol. 6, Issue 1, Feb. 1988, pp. 51-81.
Hsiao et al., "Chained Declustering: A New Availability Strategy for Multiprocessor Database Machines", Sixth Annual Conference on Data Engineering, Feb. 1990, 10 pages.
TechNet, "Jetstress Field Guide", retrieved at <<http://gallery.technet.microsoft.com/Jetstress-Field-Guide-1602d64c>>, Microsoft, Inc., Nov. 2010, 1 page.
Kistler et al., "Disconnected Operation in the Coda File System", ACM Transactions on Computer Systems, vol. 10, No. 1, Feb. 1992, pp. 3-25.
Krioukov et al., "Parity Lost and Parity Regained", The Proceedings of the 6th USENIX Conference on File and Storage Technologies, Feb. 2008, pp. 127-141.
Lee et al., "Petal: Distributed Virtual Disks", In the Proceedings of the 7th International Conference on Architectural Support for Porgramming Languages and Operating Systems, vol. 31, No. 9, Sep. 1996, 9 pages.
Lim et al., "Voluntary Disconnected Operations for Energy Efficient Mobile Devices in Pervasive Computing Environments", In Intelligent Automation & Soft Computing, vol. 19, Issue 1, Mar. 2013, pp. 1-12.
Menon et al., "IBM Storage Tank—A heterogeneous scalable SAN file system", IBM Systems Journal, vol. 42, No. 2, Nov. 2003, pp. 250-267.
Nightingale et al., "Flat Datacenter Storage", 10th USENIX Symposium on Operating Systems Design and Implementation, Oct. 18, 2012, 15 pages.
Nightingale et al., "Rethink the Sync", 7th USENIX Symposium on Operating Systems Design and Implementation, Nov. 2006, 14 pages.
Office action for U.S. Appl. No. 13/096,194, mailed on Feb. 7, 2014, Elson, et al., "Effective Circuits in Packet-Switched Networks", 23 pages.
Office action for U.S. Appl. No. 13/017,193, mailed on Dec. 5, 2013, Nightingale, et al., "Parallel Serialization of Request Processing", 19 pages.
Pawlowski et al., "NFS Version 3 Design and Implementation", Summer USENIX Conference, Jun. 1994, 15 pages.
Rodeh et al., "zFS—A Scalable Distributed File System Using Object Disks", 20th IEEE/11th NASA Goddard Conference on Mass Storage Systems and Technologies, Apr. 2003, 12 pages.
Satran et al., "Internet Small Computer Systems Interface (iSCSI)", Technical Report, RFC3720, IBM, Apr. 2004, 155 pages.
Schmuck et al., "GPFS: A Shared-Disk File System for Large Computing Clusters", In Proceedings of the Conference on File and Storage Technologies (FAST'02), Jan. 2002, pp. 231-244.
Shepler et al., "Network File System (NFS) Version 4 Minor Version 1 Protocol", Technical Report, RFC 5661, Internet Engineering Task Force, Jan. 2010, 618 pages.
Terry et al, "Managing Update Conflicts in Bayou, a Weakly Connected Replicated Storage System", in Proceedings of the 15th ACM Symposoim on Operating System Principles, Dec. 1995, pp. 172-183.
Verbowski et al., "Flight Data Recorder: Monitoring Persistent-State Interactions to Improve Systems Management", in Proceedings of the 7th USENIX Symposium on Operating Systems Design and Implementation, Nov. 2006, pp. 117-130.
"VMware View—Your Cloud, Your Desktop, Just Got Better", retrieved Jun. 2013 at <<www.vmware.com/files/pdf/view/VMware-View-Datasheet.pdf>>, VMware, Inc., 4 pages.
Vrable et al., "BlueSky: A Cloud-Backed File System for the Enterprise", Proceedings of the 10th USENIX Conference on File and Storage, Feb. 2013, 14 pages.
Vrable et al., "Cumulus: Filesystem Backup to the Cloud", In 7th USENIX Conference on File Storage Technologies, Published Feb. 24, 2009, pp. 1-14.
Vrable, "Migrating Enterprise Storage Applications to the Cloud", In Doctoral Dissertation, University of California, Published 2011, pp. 1-112.
Weil et al., "Ceph: A Scalable, High-Performance Distributed File System" in Proceedings of the 7th USENIX Symposium on Operating Systems Design and Implementation, Nov. 2006, pp. 307-320.
Weinsberg et al., "A Programming Model and System Support for Disconnected-Aware Applications on Resource-Constrained Devices", in Proceedings of the 24th International Conference on Software Engineering, May 2002, pp. 374-384.
Welch et al., "Scalable Performance of the Panasas Parallel File System" in Proceedings of the 8th USENIX Conference on File and Storage Technologies, Feb. 2008, pp. 17-33.

(56) References Cited

OTHER PUBLICATIONS

TechNet, "Windows PE Technical Reference", available at <<http://technet.microsoft.com/en-us/library/dd744322>>, Microsoft, Oct. 2009, 2 pages.
The European Office Action mailed May 23, 2014 for European patent application No. 12776594.9, a counterpart foreign application of U.S. Appl. No. 13/096,194, 6 pages.
The Supplementary European Search Report mailed May 13, 2014 for European Patent Application No. 12776594.9, 4 pages.
Office Action for U.S. Appl. No. 13/017,193, mailed on Jul. 18, 2014, Edmund B. Nightingale, "Parallel Serialization of Request Processing", 21 pages.
Office Action for U.S. Appl. No. 13/116,270, mailed on Aug. 14, 2014, Edmund B. Nightingale, "Server Failure Recovery", 15 pages.
Corbett et.al. "The Vesta Parallel File System" ACM Transactions on Computer Systems, vol. 14, No. 3, Aug. 1996, pp. 225-264.
The European Office Action mailed Oct. 6, 2014 for European patent application No. 12776594.9, a counterpart foreign application of U.S. Appl. No. 13/096,194, 6 pages.
He et al, "Performance Evaluation of Distributed iSCSI RAID", Proceedings of the International Workshop on Storage Network Architecture and Parallel I/Os, SNAPI '03, Sep. 2003, pp. 1-8.
International Search Report for PCT Application No. PCT/US2013/056070, mailed Nov. 20, 2013, 4 pgs.
"Introduction to the Azure Platform", Microsoft Patterns & Practices, retrieved at <<http://msdn.microsoft.com/en-us/library/ff803364(d=printer).aspx>>, Dec. 6, 2011, 13 pgs.
Lesem, Steve, "Cloud Storage Strategy, Insights, Observations, and Next Practices on Cloud Storage and Services", Cloud Taxonomy Archives, retrieved at <<http://cloudstoragestrategy.com/cloud-taxonomy/, Jan. 24, 2012, 21 pgs.
Office Action for U.S. Appl. No. 13/096,194, mailed on Nov. 6, 2014, Elson et al., "Effective Circuits in Packet-Switched Networks", 25 pages.
Office action for U.S. Appl. No. 13/112,978, mailed on Dec. 3, 2014, Elson, et al., "Data Layout for Recovery and Durability", 14 pages.
Office Action for U.S. Appl. No. 13/598,990, mailed on Sep. 11, 2014, Fan et al., "Block-level Access to Parallel Storage", 8 pages.
Ousterhout, et al., "The Case for RAMClouds: Scalable High-Performance Storage Entirely in DRAM", SIGOPS Operating Systems Review, vol. 43, D No. 4, Dec. 2009, pp. 1-14.
Translated Chinese Office Action mailed Jun. 3, 2015 for Chinese patent application No. 201280020755.7, a counterpart foreign application of U.S. Appl. No. 13/096,194, 15 pages.
The European Office Action mailed Apr. 1, 2015 for European patent application No. 12776594.9, a counterpart foreign application of U.S. Appl. No. 13/096,194, 6 pages.
Office action for U.S. Appl. No. 13/116,270, mailed on Mar. 12, 2015, Nightingale et al., "Server Failure Recovery", 9 pages.
Office Action for U.S. Appl. No. 13/598,990, mailed on Apr. 9, 2015, Fan et al., "Block-level Access to Parallel Storage", 18 pages.
Office action for U.S. Appl. No. 13/096,194, mailed on May 27, 2015, Elson et al., "Effective Circuits in Packet-Switched Networks", 27 pages.
Qin, et al., "Test and Simulation System of the Ad Hoc Network Based on Height Speed Ethernet", Computer Applications, Roll 26, Issue 6, Jun. 2006, pp. 1298-1300.
The European Office Action mailed Oct. 29, 2015 for European patent application No. 12776594.9, a counterpart foreign application of U.S. Appl. No. 13/096,194, 8 pages.
International Search Report and Written Opinion for PCT Application No. PCTUS2014051397, mailed Date Oct 28, 2015, 18 pgs.
Office action for U.S. Appl. No. 13/970,525, mailed on Apr. 4, 2016, Mickens et al., "Disconnected Operation for Systems Utilizing Cloud Storage", 20 pages.
Translated Chinese Office Action mailed Feb. 2, 2016 for Chinese patent application No. 201280020755.7, a counterpart foreign application of U.S. Appl. No. 13/096,194, 7 pages.
The European Office Action mailed Apr. 6, 2016 for European patent application No. 12776594.9, a counterpart foreign application of U.S. Appl. No. 13/096,194, 8 pages.

\* cited by examiner

Metadata Table 104

DATA LAYOUT FOR RECOVERY AND DURABILITY

RELATED APPLICATIONS

This U.S. patent application is a continuation-in-part patent application of co-pending prior application Ser. No. 12/763,107, entitled "Locator Table and Client Library for Datacenters," and of co-pending prior application Ser. No. 12/763,133, entitled "Memory Management and Recovery for Datacenters." Both co-pending prior applications were filed on Apr. 19, 2010. This U.S. patent application is also a continuation-in-part patent application of co-pending prior application Ser. No. 13/017,193, entitled "Parallel Serialization of Request Processing" and filed on Jan. 31, 2011. U.S. application Ser. Nos. 12/763,107, 12/763,133, and 13/017, 193 are hereby incorporated by reference in their entirety herein.

BACKGROUND

Distributed data storage systems, such as those used in cloud computing environments, often rely on a metadata server to identify which servers store what data. This metadata server typically maintains a large metadata table mapping identifiers associated with data to the servers that store the data. Because of the large number of data units distributed among the storage servers, this metadata table can often be quite large. Also, to ensure durability of the data, data items are often stored across a plurality of server replicas. Metadata tables, then, often must identify a multiple servers for each data item identifier, greatly increasing the metadata table size. This large size makes it impractical to transmit the metadata table to the clients that will use the metadata table to identify servers. The other alternative is equally problematic: many servers frequently requesting server identifications from the single metadata server, thereby introducing congestion.

Besides these difficulties, metadata tables often suffer from poor durability and poor distribution of data among the servers. Servers are often assigned to data items in a naïve manner, allowing a single or dual server failure to cause permanent data loss even when three server replicas are assigned to a data item. Also, these naïve groupings often result in sub-optimal performance during recovery in the event of server failure, with only a small subset of the available servers participating in the recovery.

SUMMARY

A metadata server described herein is configured to generate a metadata table optimized for data durability and recovery. In generating the metadata table, the metadata server associates each possible pair of servers with one of the indices of the table, each index associated with one or more data items. By utilizing each possible pair of servers, the metadata server ensures that every server participates in recovery in the event of a server failure. Additionally, the metadata server may, for sizes of combinations greater than two, associate each possible combination of servers with one of the indices of the table. In addition to associating combinations of servers to each index, the metadata server may also associate one or more additional servers with each index to provide added data durability. Upon generating the metadata table, the metadata server provides the metadata table to clients or servers for use in performing operations related to data items stored by the servers and corresponding to table indices.

In place of the metadata table, the metadata server may instead provide rules and parameters to clients to enable those clients to identify servers storing data items. The rules may define a virtual metadata table and the parameters may include the total number of servers in the system and the number of servers associated with each index. The clients may use these parameters and an index as inputs to the rules to determine the identities of servers storing or designated to store data items corresponding to the index.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
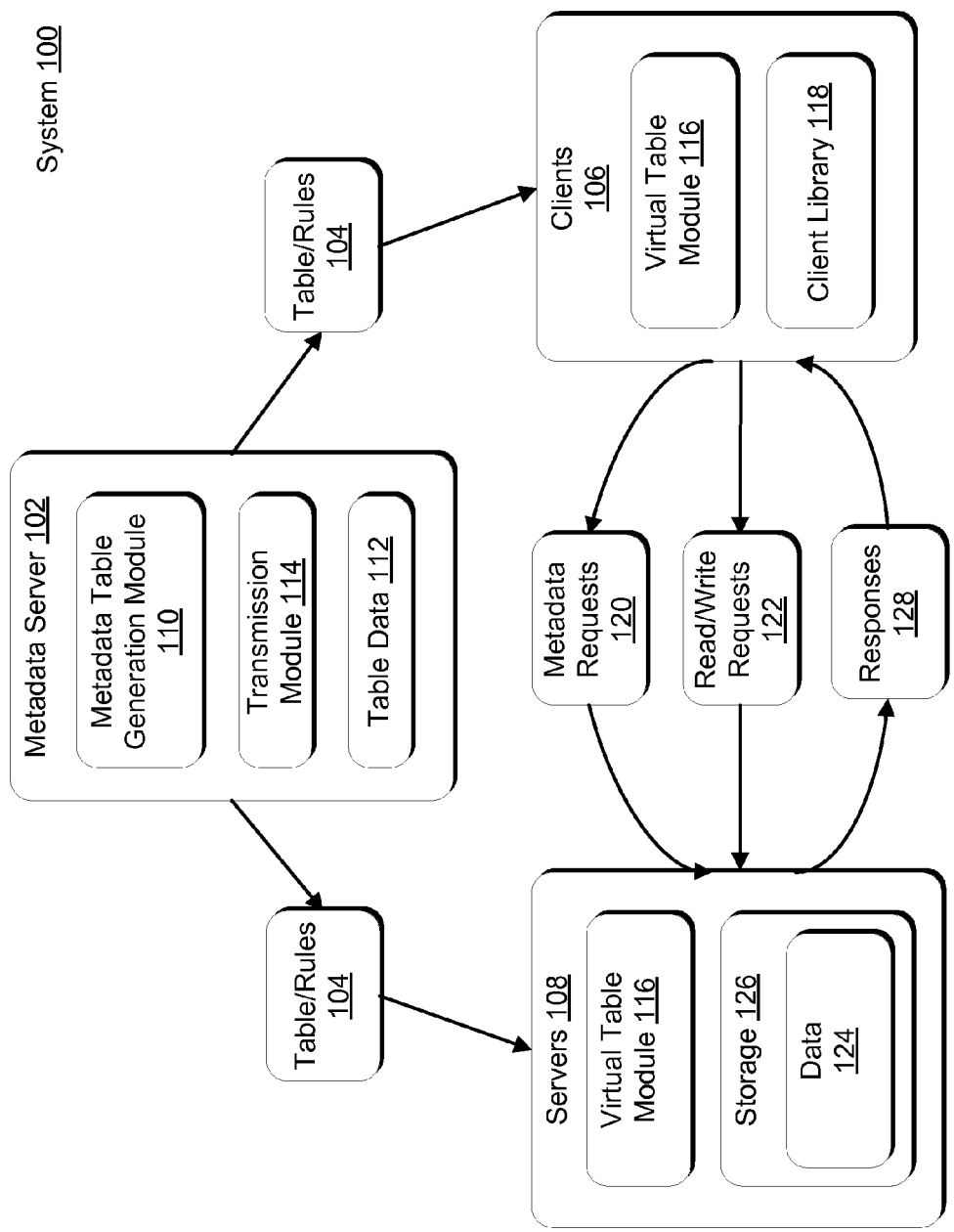
FIG. 1 illustrates an example environment in which metadata tables or rules are used by clients to identify servers associated with data items, in accordance with various embodiments.

Described herein are techniques for generating a metadata table or utilizing rules in place of the metadata table by devices of a system. Those devices may include a metadata server, servers, and one or more clients. The metadata server may be configured to generate the metadata table for use by the clients or servers or to provide the rules and rule parameters to the clients or servers.

The metadata server may generate a metadata table that ensures durability of the data stored on servers of the system by associating an index corresponding to one or more data items with a predetermined number of servers, the predetermined number of server acting as replicas of each other with respect to the one or more data items corresponding to the index. The metadata server may also ensure that the metadata table associates each server with each of the other servers so that, in the event of server failure, all servers participate in recovery. In some embodiments, the metadata server also ensures that each possible combination of servers constituting a set of server replicas associated with an index in the metadata table is a unique combination with respect to the other possible combinations. Also, in some embodiments, each server is associated with a failure domain and the metadata server only combines a given server with other servers that are not in its failure domain in constructing the set of server replicas for an index. Upon generating the metadata table, the metadata server provides the metadata table to the clients, servers, or both for use in determining the servers that store or are designated to store one or more data items.

In various embodiments, a client of the system may use one or more rules in place of the metadata table. The rules may define a virtual metadata table that need not be constructed but which may provide identities of servers through the rules. The client may be configured with the rules or provided with the rules by the metadata server. In such embodiments, the client may also receive parameters from the metadata server, including the total number of servers in the system and the number of server replicas to be associated with an index. In one embodiment, the parameters may also include at least one of server failure domains or a pseudorandom seed. The client may use these parameters as inputs to the rules. In response to inputting an index corresponding to one or more data items along with the parameters into the rules, the client receives the identities of servers associated with the index in the virtual metadata table defined by the rules. In response to the failure of a server, the client may receive one or both of updated rules or updated parameters from the metadata server. Alternatively, the client may be notified of the server failure by the metadata server and use the rules to determine identities of replacement servers for the failed server.

As mentioned, each index may be associated with one or more data items. These data items may be of any type, size, or grouping. In some embodiments, data items may be stored as units of data called "tracts." Tracts may have a predetermined same or similar size, such as one megabyte, and represent the smallest unit of data that can be read from or written to a storage unit that optimizes performance. For example, on a mechanical device, such as a disk, the tract size would be large enough to avoid to giving up performance due to the lost opportunity of reading more data "for free" after a seek or rotational delay. As a second example, on a medium such as flash, the tract size would be calculated based on the chip bandwidth and characteristics of the flash storage medium. Each tract belongs to a byte sequence, each byte sequence being comprised of multiple tracts distributed across multiple servers of the system to enable more efficient reading from and writing to the tracts. In such embodiments, the metadata table may be a "tract locator table" that may be used by clients for reading from and writing to tracts, as well as for identifying servers storing metadata for byte sequences. Also, in such embodiments, the index may be a prefix taken from a fixed length translation, such as a hash, of a tract identifier. Alternatively, the index may be the remainder of a mod operation that divides one of the prefix, the hash, or the tract identifier for a tract by the number of indices used in the tract locator table.

Tracts, byte sequences, tract locator tables, and their uses are described in greater detail in U.S. patent application Ser. No. 12/763,107, entitled "Locator Table and Client Library for Datacenters" and filed on Apr. 19, 2010, U.S. patent application Ser. No. 12/763,133, entitled "Memory Management and Recovery for Datacenters" and filed on Apr. 19, 2010, and U.S. patent application Ser. No. 13/017,193, entitled "Parallel Serialization of Request Processing" and filed on Jan. 31, 2011. These applications are incorporated by reference above in "Related Applications."

While FIG. 1 below illustrates an example environment in which the metadata table is a tract locator table and the data items are tracts, it is to be understood that the metadata table generation and rule utilization techniques described herein are in no way limited to tracts and tract locator tables.

Example Environment

FIG. 1 illustrates an example environment in which metadata tables or rules are used by clients to identify servers associated with data items, in accordance with various embodiments. As illustrated, a system 100 includes a metadata server 102 configured to provides a metadata table or rules 104 to at least one of clients 106 or servers 108 of the system 100. The metadata server 102 includes a metadata table generation module 110 configured to generate a metadata table 104 based at least on table data 112 of the metadata server 102 and a transmission module 114 configured to transmit the metadata table 104 to the clients 106 or servers 108. Alternatively or additionally, the transmission module 114 may be configured to transmit at least one of rules 104 or parameters included in the table data 112 to the clients 106 or servers 108. The clients 106 and servers 108 may each include a virtual table module 116 to utilize rules and parameters to identify servers 108 that are storing or are designated to store data items. The clients 106 may also each include a client library 118 configured to formulate and transmit metadata requests 120 or read/write requests 122 to servers 108 identified using the metadata table or rules 104. These requests 120 and 122 may relate to data 124 stored in storage 126 of the servers 108 or to data sequences of data 124 stored across a plurality of servers 108. The servers 108 may be configured to provide responses 128 to the requests 120 and 122.

Figure 6:
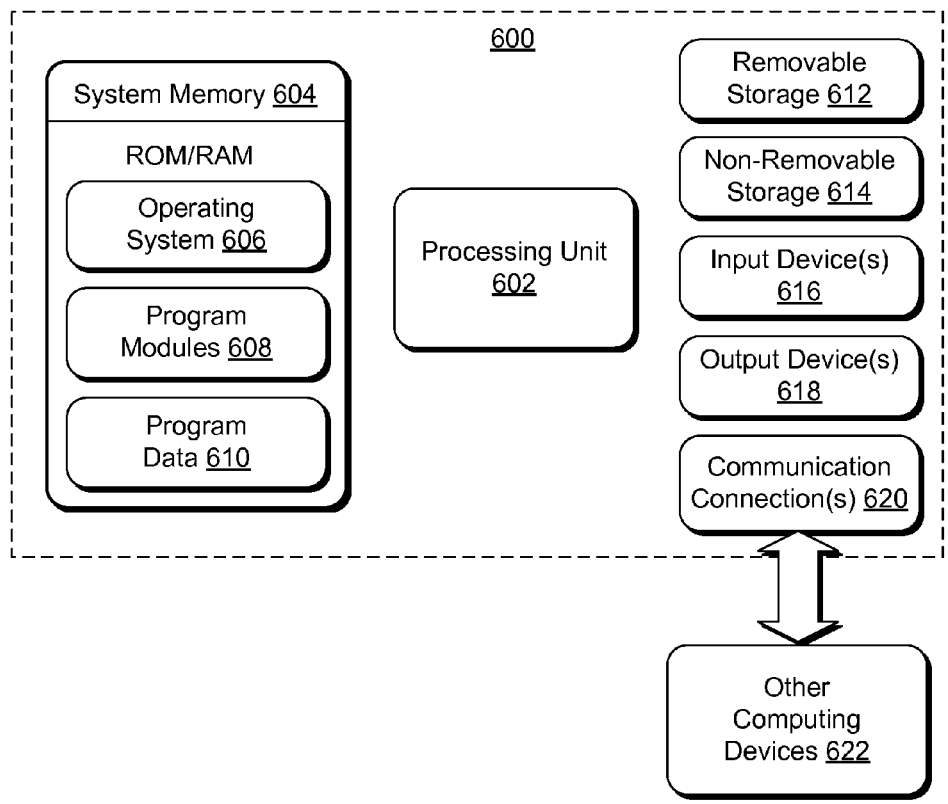
FIG. 6 illustrates a block diagram showing an example system architecture for a computer system such as a metadata server, a client or a server, in accordance with various embodiments.

In various embodiments, the metadata server 102, clients 106, and servers 108 may each be any sort of computing device or computing devices. For example, the metadata server 102, clients 106, and servers 108 may each be or include a personal computer (PC), a laptop computer, a server or server farm, a mainframe, a work station, or any other sort of device or devices. In one implementation, the metadata server 102, clients 106, and servers 108 represent a plurality of computing devices working in communication, such as a cloud computing network of nodes. When implemented on multiple computing devices, the metadata server 102, a client 106, or a server 108 may distribute the modules and data of the metadata server 102, the client 106, or the server 108 among the multiple computing devices. In some implementations, the metadata server 102, a client 106, or a server 108 represents one or more virtual machines implemented on one or more computing devices. The nature and functions of the modules and data of the metadata server 102, clients 106, and servers 108 are described further herein. An example metadata server 102, client 106, or server 108 is illustrated in FIG. 6 and is described below in greater detail with reference to that figure.

In some embodiments, each server 108 may be associated with a storage node of a computing device. In such embodiments, a computing device may include multiple servers 108, one for each storage device.

In further embodiments, servers 108 may be virtual servers. In such embodiments, virtual servers may be logical representations of servers 108, with multiple virtual servers assigned to a single actual server 108 by a table or other data structure storing virtual server-server 108 mappings. Alternatively, virtual servers may correspond to virtual machine implementations of servers 108.

In various embodiments, servers 108 belong to failure domains. Each failure domain defines one or more servers 108 that are likely to fail together, such as servers 108 sharing a rack or a computing device. Mappings of servers 108 to their failure domains may be stored by a device of the system 100, such as the metadata server 102.

In some embodiments, a network or networks may connect the metadata server 102, clients 106, and servers 108. The network or networks may be any type of networks, such as wide area networks (WANs), local area networks (LANs), or the Internet. Also, the network or networks may be public, private, or include both public and private networks. Further, the network or networks may be wired, wireless, or include both wired and wireless networks. The network or networks may utilize any one or more protocols for communication, such as the Internet Protocol (IP), other packet based protocols, or other protocols. Additionally, the network or networks may comprise any number of intermediary devices, such as routers, base stations, access points, firewalls, or gateway devices.

Figure 2:
FIG. 2 illustrates an example metadata table that includes each possible pair of servers assigned to one of the indices of the table and one or more additional servers assigned to each of the indices, in accordance with various embodiments.
Figure 3:
FIG. 3 illustrates an example metadata table that includes each possible triplet of servers assigned to one of the indices of the table, in accordance with various embodiments.

In various embodiments, the metadata table 104 may be any sort of data structure or data structures of any program or programs. For example, the metadata table 104 may include rows corresponding to indices of the metadata table 104 and columns corresponding to server replicas 108. Each index corresponds to one or more data items and the server replicas 108 associated with that index are the server replicas 108 storing or designated to store the one or more data items. Each intersection of a row and column, then, represents a server replica 108 that stores one or more data items corresponding to an index. In other embodiments, the rows and columns may be reversed, with columns corresponding to indices and rows to server replicas. In one embodiment, the metadata table 104 comprises two tables: a failure domain table and an intra-domain table. The failure domain table would replace server replica columns with failure domain columns, associating an index with multiple failure domains. The intra-domain table would then associate specific server replicas 108 within those failure domains with the indices. Example metadata tables 104 are illustrated in FIGS. 2 and 3 and are discussed further herein with reference to those figures.

Figure 4:
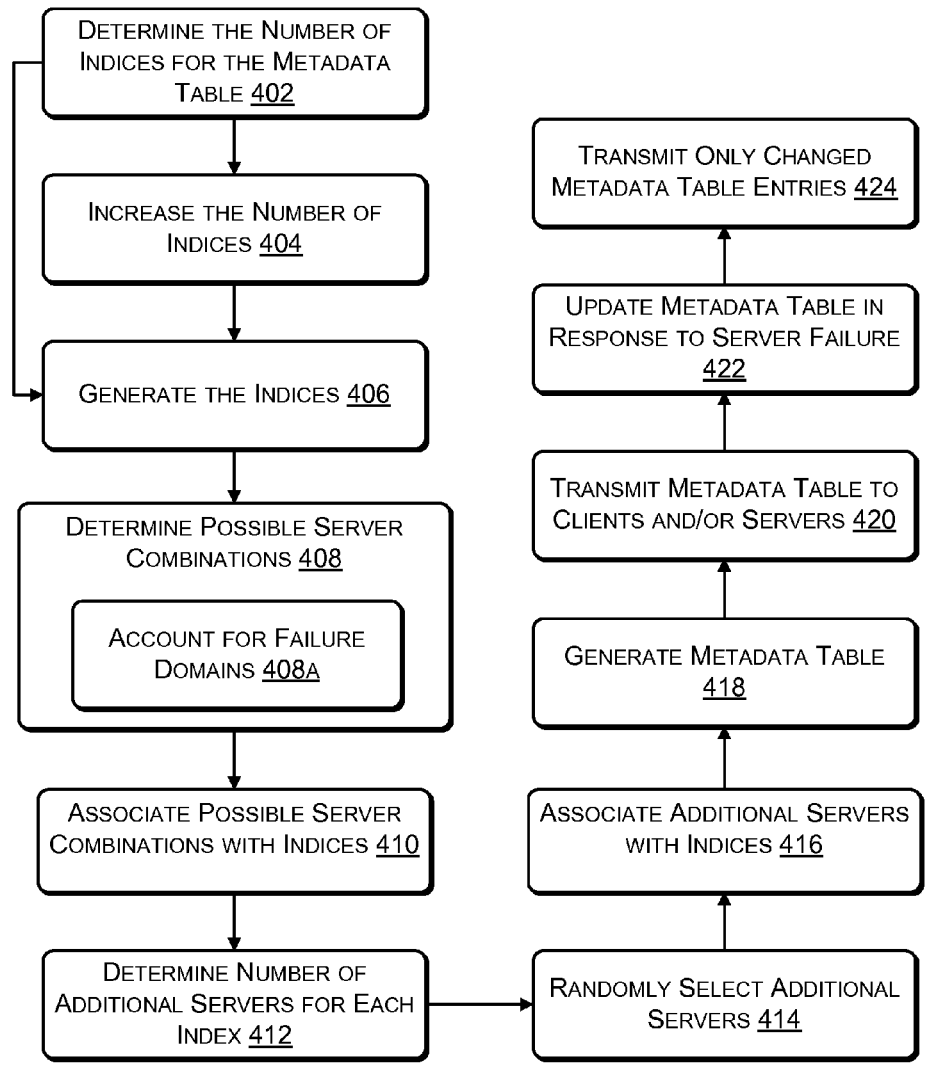
FIG. 4 illustrates a flowchart of example operations for generating a metadata table and for providing that metadata table to clients or servers, in accordance with various embodiments.

As mentioned above, the metadata table 104 may be generated by the metadata table generation module 110. In some embodiments, the metadata table generation module 110 utilizes the table data 112 and one or more rules to generate the metadata table 104. For example, one set of rules may determine the number of possible pairs of server replicas 108 and generate at least as many indices as that number of pairs. Each possible pair is then associated with one of the indices, resulting in a two column table with at least as many rows as the number of possible pairs. That table may then be supplemented with one or more additional columns of server replicas to provided added data durability. Server replicas 108 associated with indices in these additional columns may be selected randomly or pseudo-randomly. In another example, the metadata table generation module 110 may utilize another set of rules to determine the number of possible combinations of server replicas, the combinations having a specified length, such as three, four, or five servers. The number of indices in the metadata table 104 is then set to at least this possible number of combinations, and each possible combination is associated with one of the indices. An example method of generating the metadata table 104 is shown in FIG. 4 and is described further herein with reference to that figure.

In various embodiments, table data 112 may comprise any collection of data stored in one or more files or forms. Table data 112 may include the number of servers 108 in the system 100, failure domain-server mappings, such as those mentioned above, a targeted durability of the data stored in the system 100, a targeted number of server replicas 108 to be associated with each index in the metadata table 104, a mapping of virtual servers to servers 108, a pseudo-random seed for selecting server replicas 108 for indices, indications of failed servers 108, and one or more rules 104 defining a virtual metadata table, the rules 104 to be provided to clients 106 or servers 108. Any one or more items of the table data 112 may be used by the metadata table generation module 110 and the transmission module 114 in performing their respective operations.

In some embodiments, the transmission module 114 transmits the metadata table or rules 104 to clients 106 or servers 108. The transmission module 114 may also transmit parameters for rules 104, such the data stored in table data 112. The metadata table or rules 104 may be transmitted on initiative of the metadata server 102 or in response to a request from a client 106 or a server 108. The transmission may also be event driven, with the transmission module 114 transmitting an updated metadata table 104, updated rules 104, or updated parameters for rules 104 to clients 106 and servers 108 response to a server failure. The use of rules 104 in place of a metadata table 104 may be decided on a system level, with all devices of the system 100 using the same rules 104 or same metadata table 104. Alternatively, the transmission module 114 may transmit rules 104 to some clients 106 or servers 108 and metadata tables 104 to other clients 106 or servers 108. In such embodiments, however, the metadata table 104 will have been generated using the rules 104, ensuring that all devices of the system 100 are using a common reference. The transmission module 114 may be configured to provision the metadata tables 104 and/or rules 104 accordingly based on what scheme is used.

The clients 106 and servers 108 may store the metadata table or rules 104 upon reception. In some embodiments, the clients 106 and servers 108 are configured with the rules 104 and receive only the parameters from the metadata server 102. In embodiments in which clients 106 and servers 108 are configured with rules 104 or receive rules 104, the virtual table modules 116 of the clients 106 and servers 108 may utilize the rules 104 and parameters to answer requests for identifications of server replicas 108. Such requests may be received, for example, from the client library 118. The requests may provide an index and, optionally an identification of a specific server replica 108 (e.g., the first server replica 108 for that index). If an index alone is specified, all server replicas 108 for that index are determined and returned. If a specific server replica 108 is requested, that server replica 108 alone may be identified and returned. Examples of rules used to identify servers based on indices and parameters are described below with reference to FIG. 5, which illustrates a number of example operations of a virtual table module 116. In addition to identifying servers, the rules 104 may be used to identify replacement server replicas 108 in the event of a server failure.

In various embodiments, the client library 118 may be a component of client 106 configured to perform operations relating to data items and sets of data items, such as the above described tracts and byte sequences. The client library 118 determines or receives identifiers of byte sequences or tracts and uses those identifiers to generate one or more indices to the metadata table or rules 104. As mentioned above, the client library 118 may perform a fixed length translation, such as a hash, on the identifier and take as a prefix a subset of the bits resulting from the fixed length translation, using that prefix as an index. Alternatively, the client library 118 may perform a mod operation on the prefix, fixed length translation, or identifier, dividing by the number of indices used in the metadata table 104 or by the rules 104. The client library 118 may determine the number of indices by querying the metadata table 104 or by asking the virtual table module 116 to provide the number of indices. The use of fixed length translations or mod operations may ensure that the tracts comprising a byte sequence are uniformly or nearly uniformly distributed across a plurality of servers 108. Upon generating the index or indices, the client library 118 may look up the server replicas 108 associated with that index or those indices in the metadata table 104. Alternatively, the client library 118 may request that the virtual table module 116 identify the server replicas 108 and may include the index or indices in the request.

In some embodiments, the client library 118 may have received a request from a client application to create, delete, or write to a byte sequence. Using an identifier associated with the byte sequence, the client library 118 determines server replicas 108 storing byte sequence metadata. The client then transmits metadata requests 120 to the identified server replicas 108. The metadata request 120 may seek the creation or deletion of a byte sequence or the allocation of one or more tracts of a byte sequence for the client library 118 to write to. The servers 108 may provide responses 128 indicating the success or failure of these metadata requests 120 and, if tracts are allocated, provide identifiers of those tracts. Provided tract identifiers may then be used by the client library 118 to identify server replicas 108 designated to store those tracts.

Also, in some embodiments, the client library 118 may have received a request from a client application to read from or write to a byte sequence or specific tracts of a byte sequence. Using identifiers associated with the tracts, the client library 118 determines the server replicas 108 storing the tracts. If the write request is for writing to a new tract, the client library 118 first issues a metadata request 120, as described above, to receive a tract allocation. Once server replicas 108 storing or designated to store all tracts to be read from or written to are identified, the client library 118 makes read or write requests 122 to the server replicas 108. Read requests 122 may initially be made of a single server replica 108, with use of the others only being made when a response 128 is not returned. Write requests 122 may be made in parallel of the identified server replicas 108. The response 128 to a read request 122 returns a tract if the request 122 is successful. The response 128 to a write request 122 indicates success or failure of the request 122.

In some embodiments, a server failure may be detected by the client library 118. For example, a server replica 108 may not respond to a request 120 or 122 in a certain amount of time. Upon detecting failure, the client library 118 may request an updated metadata table 104 from the metadata server 102 and notify the metadata server 102 of the failure. Alternatively, the client library 118 may request identification of a recovery server replica 108 from the virtual table module 116.

In various embodiments, servers 108 may utilize the metadata table or rules 104 to determine which indices they are associated with. Knowing these indices may enable the servers 108 to validate metadata requests 120 and read/write requests 122, ensuring that it is the appropriate server 108 for the requests 120/122 and providing a negative response if it is not the appropriate server 108. The server 108 may also utilize the metadata table or rules 104 to determine which servers 108 are replicas for a given index that the server 108 is associated with. In alternative embodiments, servers 108 may not receive or utilize the metadata table or rules 104, relying on clients 106 to correctly identify servers 108 and receiving identifications of their replicas in requests 120/122 from the clients 106.

In some embodiments, the data 124 stored in storage 126 of the servers 108 comprises the above-described tracts. A single storage unit 126 of a server 108 may store data/tracts 124 from a plurality of byte sequences, the tracts 124 of a given byte sequence being distributed among a plurality of the servers 108. In other embodiments, data 124 may comprise other types of data of differing sizes. The storage 126 of each server 108 may actually be multiple storage units, as described above. Example storage units 126 can include system memory, removable storage, and non-removable storage. Such system memory, removable storage, and non-removable storage units are illustrated in FIG. 6 and are described further herein with reference to that figure.

Example Metadata Tables and Techniques for Their Generation

FIG. 2 illustrates an example metadata table that includes each possible pair of servers assigned to one of the indices of the table and one or more additional servers assigned to each of the indices, in accordance with various embodiments. As illustrated in FIG. 2, the metadata table 104 may include a plurality of indices 202. The indices 202 may be binary numbers taken as prefixes from fixed length translations, as discussed above, or integers resulting from mod operations. The indices 202 of FIG. 2 are three bit binary numbers. These three bit binary number indices are provided for the sake of illustration, and it is to be understood that binary numbers of any bit length or integers may be used instead. The indices 202 include each possible index given the type, length, or number of the indices. For example, if three bit binary numbers are used, the metadata table 104 will include eight indices 202 (two to the power of the bit length, three). Each index 202 is unique with respect to the other indices 202, ensuring that all possible indices 202 given certain criteria are included in the metadata table 104. In another example, if forty indices are targeted (based on operator plans, etc.), the indices 202 may include each integer from zero to thirty-nine, those integers representing results of mod operations performed using the targeted number of indices 202.

To ensure full participation of the servers 108 in recovery in the event of a failed server 108, each possible pair of servers 108 is determined and associated with an index 202. These server pairs are associated with an index 202 in the metadata table 104 by placing representations of the servers 108 belonging to the pair in the first server replica column 204 and the second server replica column 206. In other embodiments, other columns of the metadata table 104 may be used. Also, in some embodiments, the number of possible pairs may be taken into account when selecting the number of indices 202.

To ensure durability of the data items corresponding to the indices 202, a third server replica column 208 is added to the metadata table 104. While only a third column 208 is shown in FIG. 2, additional columns may be included for additional durability if desired. The servers 108 represented in this column 208 may be selected randomly, pseudo-randomly, or in some other manner.

The server representations shown at the intersection of each row and column may be any sort of representation. The representations may be addresses of the servers 108, such as Internet Protocol (IP) addresses. Alternatively, the server representations may be some other representation smaller than an IP address in order to minimize the size of the metadata table 104. As shown in FIG. 2, these smaller representations may be integers such as zero, one, two, three, etc. To determine the smaller representations, another table associating server IP addresses with smaller representations may be used. In some embodiments, each server 108 appears represented in the metadata table 104 approximately the same number of times. Also, no server 108 is represented more than once in any given row.

FIG. 3 illustrates an example metadata table that includes each possible triplet of servers assigned to one of the indices of the table, in accordance with various embodiments. FIG. 3 differs from FIG. 2 both in the use of triplet combinations rather than pair combinations and in the use of integers as indices 302. As mentioned above, the number of integer indices 302 may be selected based on a targeted number of indices 302. The targeted number of indices 302 may in turn be determined by the number of combinations. In FIG. 3, representations for five servers 108 appear. The number of possible triplet combinations of those five servers 108 is ten. Accordingly, ten indices 302 zero through nine are used in the metadata table 104 of FIG. 3.

Associated with each index 302 are three server representations in the three columns 304-308. These three server representations associated with a given index 302 represent servers from one of the possible triplet combinations. Because no server 108 appears more than once in any triplet combination, no server representation appears more than once in a row corresponding to a given index. Because triplet combinations rather than pair combinations are used, it may be determined that no additional columns including additional server replicas 108 are needed for data durability. A metadata table 104 including all possible triplet combinations is likely to have a larger size than a metadata table 104 including all possible pair combinations. Both metadata tables 104 may have equivalent recovery performance.

The server representations appearing at intersections of indices 302 with first server replica column 304, second server replica column 306, and third server replica column 308 may be the same sort of server representations discussed above with regard to FIG. 2.

In various embodiments, larger combinations of servers 108 may be utilized in metadata tables 104, such as quadruplet combinations, quintuplet combinations, etc. With these larger combinations, additional columns will be used in the metadata table 104 to ensure that each server 108 appearing in a combination appears in one of the columns. Thus, with quintuplet combinations, the metadata table 104 will include at least five columns.

FIG. 4 illustrates a flowchart of example operations of the metadata table generation module 110 for generating a metadata table 104 and of the transmission module 114 for providing that metadata table 104 to clients 106 or servers 108, in accordance with various embodiments. As illustrated at block 402, the metadata table generation module 110 determines the number of indices that are to appear in the metadata table 104. The metadata table generation module 110 may determine the number of indices based on a number of factors, including at least the total number of servers 108 in the system 100, a targeted number of server replicas, such as the server pairs or server triplets described and shown in FIGS. 2 and 3, a targeted data type of the indices (binary numbers or integers), and plans for growth of the number of servers 108 included in the system 100. The targeted length, targeted data type, and growth plans may be provided by an operator or other computer system and stored in the table data 112.

In some embodiments, where the targeted length of the server combinations is two, the metadata table generation module 110 calculates the number of possible combinations as follows:

$$C = \frac{n(n-1)}{2}$$

where C is the number of possible server combinations and n is the total number of servers 108 in the system 100. In other embodiments, where the targeted length of the server combinations is three, the metadata table generation module 110 calculates the number of possible combinations as follows:

$$C = \frac{n(n-1)(n-2)}{6}$$

where C is the number of possible server combinations and n is the total number of servers 108 in the system 100. In various embodiments, for various targeted lengths of the server combinations, the metadata table generation module 110 may calculate the number of possible combinations as follows:

$$^nC_k = \frac{n!}{(n-k)!k!}$$

where C is the number of possible server combinations, n is the total number of servers 108 in the system 100, and k is the targeted length of the server combinations. The above two rules for targeted lengths of two and three are special cases of this general rule.

In some embodiments, as mentioned above, servers 108 may belong to failure domains, and the metadata table generation module 110 may exclude combinations of servers that include multiple servers 108 from a given failure domain. In such embodiments, the number of possible combinations of servers 108 will be less than the numbers calculated above. For example, instead of using the total number of servers 108 for n, the total number of failure domains may be used instead, determining unique combinations of failure domains, with one server from each failure domain. Such embodiments may involve the use of multiple metadata tables 104, such as a failure domain table that includes representations of failure domains in place of server presentations and an intra-domain table that specifies which server 108 in each failure domain is associated with each index. Failure domains and servers 108 may be mapped to one another using an additional table stored in table data 112.

Upon determining the length of the possible server combinations, the metadata table generation module 110 may determine if binary numbers are used for the indices. As mentioned above, to specify all possible binary numbers of a given length, binary numbers in a power of two will be generated. This in turn means that the number of indices must be a power of two. Accordingly, at block 404, if binary number indices are to be used in the metadata table 104 and if the number of combinations of servers 108 is not a power of two, the metadata table generation module 110 may increase the number of indices from the number of combinations of servers 108 to the nearest power of two.

Further, at block 404, the metadata table generation module 110 may increase the number of indices to account for growth plans. Increasing the number of indices to account for growth plans may involve multiplying the number of server combinations by a constant multiplier (e.g., multiply by two, three, etc.). In such embodiments, the metadata table generation module 110 multiplies the number of server combinations by the multiplier, which may be found in the table data 112, and increases the result to the nearest power of two if the indices are to be binary numbers. The result of the determining at block 402 and the increasing at block 404 may be the number of indices used in the metadata table 104. In other embodiments, the number of indices may simply be stored in and retrieved from the table data 112.

At block 406, the metadata table generation module 110 generates the indices based on the targeted data type of the indices found in the table data 112. If the targeted data type is binary numbers, then the metadata table generation module 110 may utilize the determined number of indices to determine the length of the binary numbers. As mentioned, with binary number indices, the determined number of indices is a power of two. The metadata table generation module 110 may determine what that power is and set the bit length of the indices to that power. For example, if the determined number of indices is thirty-two, the metadata table generation module 110 may determine that thirty-two is two to the fifth power and set the bit length to five. The metadata table generation module 110 then generates all possible binary numbers of that bit length and uses those binary numbers as the indices. If the targeted data type is integers, then the metadata table generation module 110 may generate all possible integers from zero to one less than the determined number of indices and use those integers as the indices.

At block 408, the metadata table generation module 110 may determine the possible combinations of servers 108. In various embodiments, the metadata table generation module 110 may determine the possible combinations of servers 108 by retrieving the targeted length of the server combinations from the table data 112, by retrieving representations of all of the servers 108, and by enumerating the possible combinations of the servers 108. The metadata table generation module 110 may retrieve the server representations, for example, from a data structure stored in the table data 112, such as the above-described mapping of server IP addresses to smaller representations. Upon retrieving representations for servers 108, the metadata table generation module 110 begins generating combinations of those representations of the targeted combination length. In enumerating the combinations, the order in which the server representations appear in a given combination may be not be important. Any combination that has the same server representations—in any order—as a previously enumerated representation, is rejected. The result of these operations may be a set of combinations of server representations, the combinations being unique with respect to one another.

At block 408a, the metadata table generation module 110 may account for failure domains in generating the possible server combinations. As described above, the metadata table generation module 110 may do this by utilizing representations of failure domains in place of representations of servers 108. The unique combinations would then be unique combinations of failure domains. After generating the unique combinations of failure domains, the metadata table generation module 110 may randomly or pseudo-randomly select a server 108 from each failure domain in a combination.

At block 410, the metadata table generation module 110 associated the possible server combinations with the indices. If the number of combinations and number of indices are identical, then one combination is associated with each index. If the number of indices is greater than the number of combinations, then the metadata table generation module 110 may first associate each combination to one of the indices. The metadata table generation module 110 may then select a combination randomly or pseudo-randomly from the possible combinations and associate that combination with an index that did not have a combination associated with it in the first round of associations. In randomly or pseudo-randomly selecting combinations to associate with indices, the metadata table generation module 110 may ensure that no combination is associated with three indices until all combinations are each associated with two indices.

At block 412, the metadata table generation module 110 may determine the number of additional servers to associate with each index. That number may be the same for all indices and may be based on a targeted durability of the data stored by servers 108 of the system 100 and on a targeted length of the combinations, the targeted durability and targeted length retrieved from the table data 112. For example, if the targeted durability specifies four concurrent server failures as the tolerable limit for data loss and the targeted length of the combinations is two, then the metadata table generation module 110 may determine that two additional servers 108 should be associated with each index to ensure that each index is associated with four different servers 108.

At block 414, the metadata table generation module 110 randomly or pseudo-randomly selects the additional servers to associate with each index. Pseudo-random selection may be based on a pseudo-random seed retrieved by the metadata table generation module 110 from the table data 112. The pseudo-random seed is used by a pseudo-random number generator to generate a number that is used in pseudo-randomly selecting an additional server 108. Upon randomly or pseudo-randomly selecting an additional server 108 for an index, the metadata table generation module 110 compares the randomly/pseudo-randomly selected additional server 108 to the servers 108 already associated with an index. If the additional server 108 is already associated with a given index, then the metadata table generation module 110 randomly or pseudo-randomly selects a different additional server 108, ensuring that no server 108 is twice associated with a same index. At block 416, these selected additional servers are then associated with their respective indices.

At block 418, the metadata table generation module 110 generates the metadata table 104. The metadata table generation module 110 may generate the metadata table 104 incrementally while performing operations 402-416, or may do so upon completion of operations 402-416. If generating the metadata table 104 upon completion of operations 402-416, the metadata table generation module 110 may retrieve the generated indices and the servers 108 associated with each index from, for example, one or more data structures of the metadata table generation module 110 that store the indices, the server representations, and the associations of servers 108 with indices. In some embodiments, the metadata table generation module 110 may generate a row for each index and a column for each server replica. The number of columns may correspond to the number of servers 108 associated with each index. The metadata table generation module 110 may store representations of the servers 108 associated with each index in intersections of the columns with the row corresponding to that index. In other embodiments, indices may correspond to columns and server replicas 108 to rows. The metadata table generation module 110 may then store the generated metadata table 104 on the metadata server 102 or on some other device and may notify the transmission module 114 that a metadata table 104 has been generated.

At block 420, the transmission module 114 transmits the metadata table 104 to clients 106 or servers 108. In some embodiments, the transmission module 114 transmits the metadata table 104 to all clients 106 and servers 108 in the system 100. In other embodiments, the transmission module 114 transmits the metadata table 104 to a subset of the clients 106 and/or servers 108, the subset specified, for example, in the table data 112.

At block 422, the metadata table generation module 110 updates the metadata table 104 in response to a server failure. The metadata server 102 may determine occurrence of a server failure by receiving notification of the failure from a client 106 or server 108 or by failing to receive a "heartbeat" message that servers 108 are configured to periodically transmit to the metadata server 102. If a server 108 does not transmit a heartbeat message in a specified amount of time, the metadata server 102 may determine that a failure has occurred. Upon determining the occurrence of a failure, the metadata server 102 may notify the metadata table generation module 110 of the failure and of the identity of the server 108 that has failed. Upon receiving this notification, the metadata table generation module 110 may determine entries in the metadata table 104 that correspond to the failed server 108 and may replace the representations of the failed server with representations of other servers 108. The metadata table generation module 110 may randomly or pseudo-randomly select a replacement server 108 for each row that includes a failed server 108, also ensuring that the randomly or pseudo-randomly selected replacement server 108 is not the failed server 108 and is not already included in that row. Upon generating the updated metadata table 104, the metadata server 102 may instruct the other servers 108 in a row that includes a replacement server 108 to write data items associated with the index that corresponds to the row to that replacement server 108.

At block 424, the transmission module 114 transmits the updated metadata table 104 to clients 106 and/or servers 108. In some embodiments, the transmission module 114 transmits only the rows of the metadata table 104 that have been updated. In other embodiments, the transmission module 114 transmits only the changed entries of the metadata table 104 along with the row and column that each entry corresponds to in order to enable the clients 106 and/or servers 108 to generate the updated metadata table 104.

Example Rules and Techniques for Their Utilization

Figure 5:
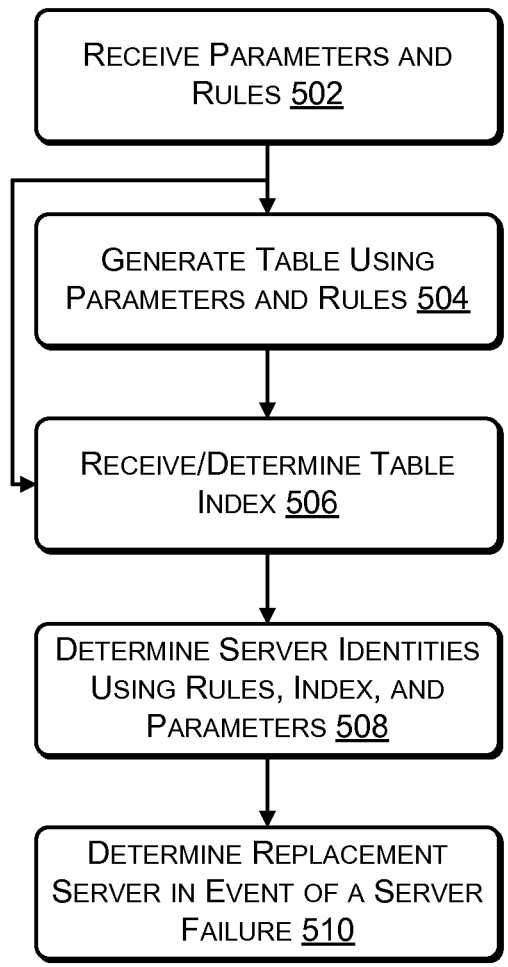
FIG. 5 illustrates a flowchart of example operations for utilizing one or more rules defining a virtual metadata table to identify servers associated with an index that corresponds to one or more data items, in accordance with various embodiments.

FIG. 5 illustrates a flowchart of example operations of a virtual table module 116 for utilizing one or more rules 104 defining a virtual metadata table to identify servers 108 associated with an index that corresponds to one or more data items 124, in accordance with various embodiments. As illustrated at block 502, the virtual table module 116 may receive rules 104 or parameters for rules 104 from the metadata server 102. In various embodiments, parameters alone may be transmitted when the virtual table module 116 is already configured to include the rules 104. The parameters may include, for example, the total number of servers 108 in the system 100, the number of possible indices, the targeted number of server replicas, mappings of server IP addresses to smaller representations, mapping of server representations or server IP addresses to failure domain representations, and a pseudo-random seed. The rules 104 may be one or more algorithms, formulas, or modules taking the parameters, an index, and optionally, a choice of server replica groups as inputs and producing identifications of one or more server replicas 108 as outputs. The rules 104 are said to define a virtual metadata table because the outputs, along with their correlations to indices and choices of server replica groups (e.g., the second server replica group as represented by the second column in a metadata table 104), may be collectively organized into a metadata table 104.

At block 504, the virtual table module 116 may optionally generate a metadata table using the rules 104. As mentioned, the collective outputs of the rules 104 and their associations to indices and server replica groups may form a metadata table 104. To generate the metadata table 104, the virtual table module 116 provides each possible pair of an index and a server replica group (the equivalent of each pair of a row and a column) to the rules 104 and includes the output as the intersection of row for that index and a column for that server replica group. The output is an integer representation of a specific server replica 108 or of a specific failure domain that may be used along with the above mentioned mappings to identify server IP addresses for further use by the client 106 or server 108 associated with the virtual table module 116.

At block 506, the virtual table module 116 receives or determines an index as part of a request for one or more server identifications from the client 106 or server 108 that includes the virtual table module 116. In addition to the index, the request may also include an identification of one or more server replica groups. In some embodiments, the index provided may be a binary number. In such embodiments, the virtual table module 116 may perform a mod operation on the received index, using the total number of indices to appear in the table as the divisor. The output of the mod operation will be an integer between zero and one less than the total number of indices. That integer is used in place of the binary number index received in the request. In other embodiments, the virtual table module 116 may provide the total number of indices to the client 106 or server 108 that includes the virtual table module 116 in order to enable the client 106 or server 108 to generate the integer index and provide it in the request. The total number of indices may be a function of the rules 104 utilized or may be determined at the metadata server 102 using the above-described techniques for determining the total number of indices and provided to the virtual table module 116 as a parameter.

At block 508, the virtual table module 116 utilizes the index, parameters, and optionally, server replica group as inputs to one or more formula in order to determine identities of servers 108 associated with the index and server replica groups. In various embodiments, any number of rules 104 may be used. The rules 104 may require that no index be associated with the same server 108 in two or more server replica groups. In some embodiments, this requirement is extended to failure domains, requiring that no index be associated with the same failure domain two or more times. Further, the rules 104 may require that the data 124 stored on one server 108 be evenly distributed over the other servers 108 in the system, ensuring that those other servers 108 participate in recovery in the event of the failure of that server 108.

In some embodiments, the rules 104 may define a virtual metadata table with three server replica groups (i.e., three column equivalents). Those rules 104 may include the following formulas:

$$f(1,r) = \text{floor}(r/n)$$

$$f(2,r) = (r + f(1,r))$$

$$f(3,r) = (f(1,r) + f(2,r))$$

In these formulas, r represents the index and n represents the total number of servers 108 in the system 100. f(1,r) represents the identity of the server 108 belonging to the first replica group that is associated with the index r. f(2,r) represents the identity of the server 108 belonging to the second replica group that is associated with the index r. f(3,r) represents the identity of the server 108 belonging to the third replica group that is associated with the index r. If the request received by the virtual table module 116 specified a server replica group (e.g., the second server replica group), then only the formula corresponding to that group (e.g., second formula (f(2,r))) would be used. If the request not does specify a server replica groups, then the virtual table module 116 may determine identifies of servers 108 for each of the server replica groups given the index r. In some embodiments, these formulas may produce illegitimate results, such as a multiple identifications of a same server 108 (or different servers 108 from a same failure domain) for a same index. For example, given the index r=1, the formulas produce the following identifications: 0, 1, 1. Thus, the server representation 1 is associated with the index 1 twice. In such embodiments, the index r may be input into a pseudo-random function that, using the pseudo-random seed, replaces index r with an index r'. The virtual table module 116 may then use index r', and return its identified servers 108 as the output of rules 104. If r' also generates illegitimate results, then the virtual table module 116 may generate a further replacement index r", and so on.

In other embodiments, different rules 104 may define a different virtual metadata table. Such different rules 104 may utilize a prime number n as the total number of servers 108 in the system 100, may utilize n server replica groups, and may utilize $n^2-n$ indices. Such different rules 104 may correspond to a number of different non-constant arithmetic progressions input to mod operations that use n as the divisor. For example, the rules 104 may correspond to the following formula:

$$f = (((1 + \text{floor}(r/n)) * c) + r) \mod n$$

In this formula, r is an index between 0 and $n^2-n-1$, c is a server replica group between 0 and n−1, and f is an identified server 108. If the request received by the virtual table module 116 specified a server replica group (e.g., the second server replica group), then only the value of c corresponding to that group (e.g., c=1) would be used. If the request not does specify a server replica groups, then the virtual table module 116 may determine identifies of server 108 for each of the server replica groups c given the index r. If each server replica 108 for an index r is identified, then the rules 104 return n identified servers 108. In some embodiments, the virtual table module 116 may reserve one or more of these server replica groups as recovery servers 108 to be used in the event of server failure. In such embodiments, the virtual table module 116 may return only the first m of the identified servers 108 or may simply use the rules 104 to determine identified servers 108 for c=0 through m=−1, m being some number less than n. For example, m may be three server replica groups and n may be five total server replica groups, thus leaving the fourth and fifth server replica groups available for recovery.

In various embodiments, the virtual table module 116 may account for failure domains by using the outputs of the rules 104 as failure domain identifiers rather than server identifiers. In such embodiments, upon identifying the failure domain identifiers, the virtual table module 116 may utilize the mappings of failure domains to servers 108 and a pseudo-random seed to select one of the servers 108 in the mappings for each identified failure domain. For example, the virtual table module 116 may determine the number of entries in the mappings for an identified failure domain and perform a mod operation on the index r using that number of identified failure domain entries as the divisor. A number between 0 and one less than the number of identified failure domain entries will be returned by the mod operation. The virtual table module 116 may then select the server 108 corresponding $p^{th}$ identified failure domain entry, p being the output of the mod operation and counting the first such entry as p=0. The selected servers 108 for the identified failure domains may then be returned by the virtual table module 116 as results.

At block 510, the virtual table module 116 may determine a replacement server 108 in the event of server failure. As mentioned above, the one or more rules 104 may include server replica groups that are reserved by the virtual table module 116 for recovery. In the event of server failure, the virtual table module 116 utilizes the identity of the failed server (which may be received from the metadata server 102, a client 106, or a server 108) as input to the rules to determine the indices r associated with the failed server. The virtual table module 116 may then identify servers 108 in the first of the reserved server replica groups that correspond to the indices r and use those identified servers 108 in place of the failed server. In other embodiments, the virtual table module 116 may receive updated rules 104 and/or updated parameters for rules 104 responsive to a server failure and may utilize those updated rules 104 and/or parameters going forward.

Example Computer System Architecture

FIG. 6 illustrates a block diagram showing components of a computer system 600 such as a metadata server 102, a client 106 or a server 108, in accordance with various embodiments. In various embodiments, computer system 600 may include at least one processing unit 602. The processing unit 602 may be any sort of processing unit. The processing unit 602 may also or alternatively include one or more graphic processing units (GPUs).

System memory 604 of the computer system 600 may store program instructions that are loadable and executable on the processor(s) 602, as well as data generated during the execution of these programs. Depending on the configuration and type of computing device, system memory 604 may be volatile (such as random access memory (RAM)) and/or non-volatile (such as read-only memory (ROM), flash memory, etc.). The computer system 600 may also include additional removable storage 612 and/or non-removable storage 614 including, but not limited to, magnetic storage, optical disks, and/or tape storage. The disk drives and their associated computer-readable media may provide non-volatile storage of computer readable instructions, data structures, program modules, and other data for the computing devices. In some implementations, the system memory 604 may include multiple different types of memory, such as static random access memory (SRAM), dynamic random access memory (DRAM), or ROM. In embodiments in which the computing device 600 is a server 108, the storage 126 of the server 108 may be any one or more of the system memory 604, removable storage 612, or non-removable storage 614.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. System memory 604, removable storage 612, and non-removable storage 614 are examples of computer storage media.

In contrast, communication media may embody computer readable instructions, data structures, program modules, or other data in a modulated data signal, such as a carrier wave, or other transmission mechanism. As defined herein, computer storage media does not include communication media.

As further shown in FIG. 6, the system memory 604 may store an operating system 606, program modules 608, and program data 610. The operating system 606 may be any sort of operating system or operating systems known in the art. The program modules 608 and program data 610 may include any one or more of the tables/rules 104, the metadata table generation module 110, the table data 112, the transmission module 114, the virtual table module 116, the client library 118, or the data 124, these components being described above in greater detail.

Computer system 600 may also have input device(s) 616 such as a keyboard, a mouse, a touch-sensitive display, voice input device, etc. Output device(s) 618 such as a display, speakers, a printer, etc. may also be included. These devices are well known in the art and need not be discussed at length here.

Computer system 600 may also contain communication connections 620 that allow the device to communicate with other computing devices 622. The communication connections 620 are implemented at least partially by network interface components. The other computing devices 622 may be any of the metadata server 102, the clients 106, or the servers 108. For example, the metadata server 102 may be a computing system 600 and a client may be another computing device 622 which communicates with the metadata server 102 using the communication connections 620.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
receiving, by a computing device, a total number of servers in a system and one or more rules defining a virtual metadata table of the system;
determining, by the computing device, identities of a subset of the servers by utilizing at least an index to the virtual metadata table, the index associated with one or more data items stored on the subset of the servers, and the total number of servers in the system as inputs to the one or more rules defining the virtual metadata table, wherein the one or more rules include:
a first formula to identify a first server of the subset of servers based at least in part on the index and the total number of servers in the system;
a second formula to identify a second server of the subset of servers based at least in part on the index and a first output of the first formula; and
a third formula to identify a third server of the subset of servers based at least in part on the first output of the first formula and a second output of the second formula; and
generating, by the computing device, a metadata table corresponding to the virtual metadata table, wherein data at the computing device is stored in the subset of servers based at least in part on the metadata table.

2. The method of claim 1, further comprising receiving from a metadata server of the system at least one of the total number of servers in the system or the one or more rules defining the virtual metadata table.

3. The method of claim 1, wherein the determining the identities of the subset of servers further includes utilizing at least one of a specific number of servers included in the subset of servers, a number of failure domains in the system, or a pseudo-random seed as inputs to the one or more rules.

4. The method of claim 1, further comprising locating the index in the metadata table.

5. The method of claim 1, further comprising determining a replacement server in the event of a server failure based on the one or more rules or based on one or more replacement rules generated responsive to the server failure.

6. The method of claim 1, wherein:
the first formula includes $f(1,r)=(\text{floor}(r)/(n))$;
the second formula includes $f(2,r)=(r+f(1,r))$; and
the third formula includes $f(3,r)=(f(1,r)+f(2,r))$,
wherein r is the index, n is the total number of servers in the system, $f(1,r)$ is the first identified server of the subset of servers, $f(2,r)$ is the second identified server of the subset of servers, $f(3,r)$ is the third identified server of the subset of servers, and both the indices and the servers of the subset of servers are integers.

7. The method of claim 1, wherein the rules include non-constant arithmetic progressions input to mod operations using the total number of servers in the system as a divisor.

8. The method of claim 1, wherein the servers in the system are virtual servers.

9. A computing device comprising:
one or more processors;
one or more computer storage media storing computer-executable instructions that, when executed by the one or more processors, cause the one or more processors to:
receive, by the computing device, a total number of servers in a system and one or more rules defining a virtual metadata table of the system;
determine, by the computing device, identities of a subset of the servers by utilizing at least an index to the virtual metadata table, the index associated with one or more data items stored on the subset of the servers, and the total number of servers in the system as inputs to the one or more rules defining the virtual metadata table, wherein the one or more rules include:
a first formula to identify a first server of the subset of servers based at least in part on the index and the total number of servers in the system;
a second formula to identify a second server of the subset of servers based at least in part on the index and a first output of the first formula; and
a third formula to identify a third server of the subset of servers based at least in part on the first output of the first formula and a second output of the second formula; and
generate, by the computing device, a metadata table corresponding to the virtual metadata table, wherein data at the computing device is stored in the subset of servers based at least in part on the metadata table.

10. The computing device of claim 9, wherein the computer-executable instructions further cause the one or more processors to receive from a metadata server of the system at least one of the total number of servers in the system or the one or more rules defining the virtual metadata table.

11. The computing device of claim 9, wherein the determining the identities of the subset of servers further includes utilizing at least one of a specific number of servers included in the subset of servers, a number of failure domains in the system, or a pseudo-random seed as inputs to the one or more rules.

12. The metadata server of claim 9, wherein the computer-executable instructions further cause the one or more processors to locate the index in the metadata table.

13. The computing device of claim 9, wherein the computer-executable instructions further cause the one or more processors to determine a replacement server in the event of a server failure based on the one or more rules or based on one or more replacement rules generated responsive to the server failure.

14. The computing device of claim 9, wherein:
the first formula includes $f(1,r)=(\text{floor}(r)/(n))$;
the second formula includes $f(2,r)=(r+f(1,r))$; and
the third formula includes $f(3,r)=(f(1,r)+f(2,r))$,
wherein r is the index, n is the total number of servers in the system, $f(1,r)$ is the first server of the subset of servers, $f(2,r)$ is the second server of the subset of servers, $f(3,r)$ is the third server of the subset of servers, and both the indices and the servers of the subset of servers are integers.

15. The computing device of claim 9, wherein the rules include arithmetic progressions input to mod operations using the total number of servers in the system as a divisor.

16. A system comprising:
one or more processors;
one or more computer storage media storing computer-executable instructions that, when executed by the one or more processors, cause the one or more processors to:
receive a number of servers in the system and one or more rules defining a virtual metadata table of the system;
determine identities of the subset of the servers based at least in part on an index to the virtual metadata table, the index associated with one or more data items stored on the subset of the servers, and the number of servers in the system as inputs to the one or more rules defining the virtual metadata table, wherein the one or more rules include:
a first formula to identify a first server of the subset of servers based at least in part on the index and the number of servers in the system;
a second formula to identify a second server of the subset of servers based at least in part on the index and a first output of the first formula; and
a third formula to identify a third server of the subset of servers based at least in part on the first output of the first formula and a second output of the second formula; and
generate a metadata table corresponding to the virtual metadata table, wherein data at the computing device is stored in the subset of servers based at least in part on the metadata table.

17. The system of claim 16, wherein the computer-executable instructions further cause the one or more processors to receive from a metadata server of the system at least one of the number of servers in the system or the one or more rules defining the virtual metadata table.

18. The system of claim 16, wherein the determining the identities of the subset of servers further includes utilizing at least one of a specific number of servers included in the subset of servers, a number of failure domains in the system, or a pseudo-random seed as inputs to the one or more rules.

19. The system of claim 16, wherein the computer-executable instructions further cause the one or more processors to determine a replacement server in the event of a server failure based on the one or more rules or based on one or more replacement rules.

20. The system of claim 16, wherein:
the first formula includes $f(1,r)=(\text{floor}(r)/(n))$;
the second formula includes $f(2,r)=(r+f(1,r))$; and
the third formula includes $f(3,r)=(f(1,r)+f(2,r))$,
wherein r is the index, n is the number of servers in the system, $f(1,r)$ is the first server of the subset of servers, $f(2,r)$ is the second server of the subset of servers, $f(3,r)$ is the third server of the subset of servers, and both of the index and the servers of the subset of servers are integers.

* * * * *